C. J. ROY.
TRAP.
APPLICATION FILED JULY 2, 1919.
1,332,360.
Patented Mar. 2, 1920.
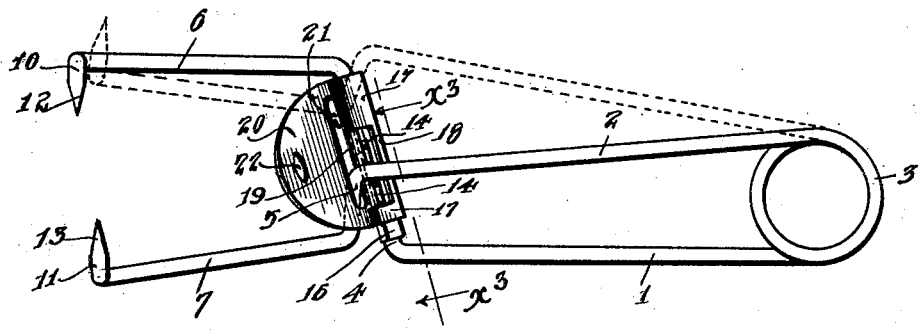
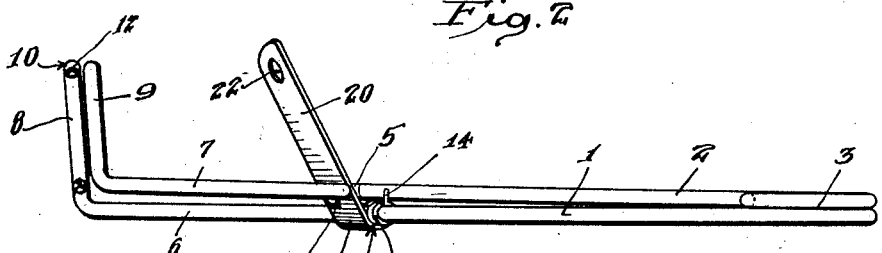
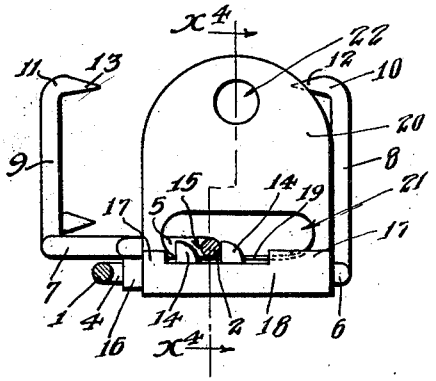
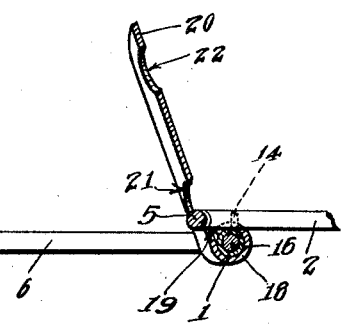
WITNESSES
INVENTOR
Charles J. Roy
BY
ATTORNEY

UNITED STATES PATENT OFFICE.

CHARLES J. ROY, OF LOS ANGELES, CALIFORNIA.

TRAP.

1,332,360.  Specification of Letters Patent.  Patented Mar. 2, 1920.

Application filed July 2, 1919. Serial No. 308,263.

*To all whom it may concern:*

Be it known that I, CHARLES J. ROY, a citizen of the United States, residing at Los Angeles, in the county of Los Angeles and State of California, have invented a new and useful Trap, of which the following is a specification.

An object of this invention is to provide a trap for catching rodents and the like.

Another object is to produce a trap of this character of comparatively simple construction and one that is relatively cheap to manufacture.

This invention is an improvement on my Patent No. 1,271,372, dated July 2, 1918, and an object is to so construct the trap that the impaling points can approach near enough to one another to make it impossible for the rodent springing the trap to slip from between the points no matter how small the rodent be or at what portion thereof the jaws engage him.

Other objects and advantages will appear in the subjoined detailed description.

The accompanying drawings illustrate the invention:

Figure 1 is a plan view of a trap embodying the invention, the trap being shown in "set" position in solid lines and one of the arms being shown in "sprung" position in dotted lines.

Fig. 2 is a side elevation of Fig. 1.

Fig. 3 is an elevation partly in section on line indicated by $x^3$—$x^3$, Fig. 1.

Fig. 4 is an enlarged fragmental sectional elevation on line indicated by $x^4$—$x^4$, Fig. 3.

The trap is provided with arms 1, 2, one crossing the other, connected together at their rear ends by a coil 3. The arm 1 is provided with an obtuse angle bend at 4 forming a cross bar, and the arm 2 extends over the angular portion 4 and is bent at an obtuse angle at 5 to form a cross bar slightly in advance of the cross bar 4. The cross bar 5 is shorter than the cross bar 4. The arms 1, 2 extend forwardly from the cross bars 4, 5 in straight members 6, 7 respectively and at the forward ends of the members 6, 7 the arms are bent upwardly to form vertical members 8, 9 respectively and said arms thence extend inwardly toward one another to form jaws 10, 11 respectively, said jaws 10, 11 terminating in points 12, 13 for impaling the rodent caught in the trap. The coil 3 constitutes a spring for causing the points 12, 13 to be held toward one another and said coil is consequently of spring material. In the instance shown in the drawings the arms 1, 2 and coil 3 are formed of a single piece of material, for example spring steel, spring brass or the like.

The cross bar 4 is provided with a tooth or teeth 14 separated by notches 15. These teeth 14 are designed to hold the arm 2 under tension in various set positions one of which is shown in full lines in Fig. 1. The teeth 14 in this instance project from a sleeve 16. In the instance shown in the drawings the arms 1, 2 are of circular cross section.

Journaled at 17 on the cross bar 4 is a release member 18 of more or less semicircular form, the front edge of the member 18 forming an abutment 19 adapted to engage the under side of the arm 2 to raise said arm from engagement with the notch 15 when the member 18 is rotated for that purpose. Rotation of the member 18 is effected, in this instance, by a trigger in the form of a plate 20 and, in the drawings, the plate is integral with the release member 18, in fact in making the trap a single piece of plate material may be provided with a transverse slot 21 through which the arm 2 extends and the lower edge of the plate is bent into a tubular form to make the journals 17 and release member 18, there being a portion of the plate cut away between the journals 17 so as to produce the abutment 19. It is clear that when the arm 2 is in one of the notches 15, pushing of the plate 20 rearwardly toward the coil 3 will cause the abutment 19 to release the arm 2 which will then be sprung into the dotted position shown in Fig. 1 so as to move its point 13 toward the point 12. The plate 20 is preferably provided with an opening 22 of any suitable shape and size.

In practice, to catch a rodent, for instance a gopher, the trap will be inserted in the hole made by the gopher with the points 12, 13 downward. When the gopher endeavors to come out of the hole he will strike the plate 20 and force the same rearwardly toward the coil 3 so as to release the arm 2, whereupon the point 13 will spring toward the point 12, impaling the gopher on said points.

The opening 22 allows light to pass through the plate 20 and the gopher, seeing the light, endeavors to enlarge the opening sufficiently to pass therethrough and in doing this forces the plate 20 rearwardly so as to allow the trap to be sprung as above described.

It is to be noted that because of the construction of the arms 1, 2 with the obtuse angular bent cross bars 3, 5, the portion of the arm 2 rearwardly of the cross bar 5 is in the slot 21, when the jaws are open, and the portion 7 of said arm is in the slot 21, when the jaws are closed, thus providing for maximum spacing of the open jaws and minimum spacing of the closed jaws.

The invention is not limited to the exact details of construction described above and shown in the drawings but embraces such changes and modifications as lie within the spirit and scope of the appended claim.

I claim:

A trap comprising arms having jaws, said arms having angularly bent cross bars respectively, a trigger journaled on one of the cross bars and having a slot to accommodate the arm having the other cross bar, the cross bars being of such relative angularity that the portion of the slot-engaging arm rearwardly of its cross bar is adapted to engage the slot when the jaws are open and the portion of the slot-engaging arm forwardly of its cross bar is adapted to engage the slot when the jaws are closed, means to relatively move the arms toward each other, means to hold the arms with the jaws open, and an abutment on the trigger to release the arms from the holding means.

Signed at Los Angeles, California, this 27th day of June, 1919.

CHARLES J. ROY.

Witnesses:
GEORGE H. HILES,
L. BELLE WEAVER.